US010530692B2

(12) United States Patent
Nidumolu et al.

(10) Patent No.: US 10,530,692 B2
(45) Date of Patent: Jan. 7, 2020

(54) SOFTWARE FIB ARP FEC ENCODING

(71) Applicant: Arista Networks, Inc., Santa Clara, CA (US)

(72) Inventors: Kalyan Nidumolu, Fremont, CA (US); Navdeep Bhatia, Sunnyvale, CA (US)

(73) Assignee: Arista Networks, Inc., Santa Clara, CA (US)

( * ) Notice: Subject to any disclaimer, the term of this patent is extended or adjusted under 35 U.S.C. 154(b) by 199 days.

(21) Appl. No.: 15/244,613

(22) Filed: Aug. 23, 2016

(65) Prior Publication Data

US 2017/0070431 A1    Mar. 9, 2017

Related U.S. Application Data

(60) Provisional application No. 62/214,724, filed on Sep. 4, 2015.

(51) Int. Cl.
*H04L 12/741* (2013.01)
*H04L 12/46* (2006.01)
*H04L 12/749* (2013.01)
*H04L 12/721* (2013.01)

(52) U.S. Cl.
CPC ........ *H04L 45/745* (2013.01); *H04L 12/4641* (2013.01); *H04L 45/741* (2013.01); *H04L 45/66* (2013.01)

(58) Field of Classification Search
CPC .......................... H04L 45/745; H04L 12/4641
See application file for complete search history.

(56) References Cited

U.S. PATENT DOCUMENTS

| | | | | |
|---|---|---|---|---|
| 7,467,227 B1 * | 12/2008 | Nguyen | ............... | H04L 12/2856 709/238 |
| 8,995,301 B1 * | 3/2015 | Miller | ..................... | H04L 45/00 370/254 |
| 2002/0110087 A1 * | 8/2002 | Zelig | ....................... | H04L 45/00 370/236 |
| 2004/0131079 A1 * | 7/2004 | Hegde | ..................... | H04L 45/50 370/466 |

(Continued)

OTHER PUBLICATIONS

E. Rosen—Cisco Systems, Inc.; A. Viswanathan—Forcel 10 Networks, Inc.; R. Callon—Juniper Networks, Inc. Jan. 2001; Multiprotocol Label Switching Architecture Network Working, Request for Comments Category: Standards Track.*

*Primary Examiner* — Hassan Kizou
*Assistant Examiner* — Deepa Belur
(74) *Attorney, Agent, or Firm* — Haley Guiliano LLP

(57) ABSTRACT

Described herein are various embodiments of a network element to process routing entries in a forwarding information base (FIB) for hosts that are directly attached to a multi-layer network element to encode address resolution protocol (ARP) data into forwarding equivalence class (FEC) entries for the directly attached hosts. One embodiment provides for a network element comprising a control plane including a forwarding agent and a data plane coupled to the control plane. The data plane can include a forwarding engine to forward a unit of network data from an ingress interface to an egress interface. The forwarding agent can be configured to program the forwarding engine with a forwarding information base having data-link layer forwarding data encoded into a network-layer forwarding entry.

20 Claims, 11 Drawing Sheets

FIB ARP FEC ENCODING - 500

(56) References Cited

U.S. PATENT DOCUMENTS

| | | | |
|---|---|---|---|
| 2005/0018605 A1* | 1/2005 | Foote | H04L 12/4641 370/230 |
| 2007/0104194 A1* | 5/2007 | Wijnands | H04L 12/185 370/390 |
| 2007/0127502 A1* | 6/2007 | Zhu | H04L 45/507 370/397 |
| 2011/0314355 A1* | 12/2011 | Grube | G06F 11/1076 714/763 |
| 2012/0057466 A1* | 3/2012 | Allan | H04L 45/125 370/238 |
| 2012/0069745 A1* | 3/2012 | Kini | H04L 45/22 370/252 |
| 2015/0263899 A1* | 9/2015 | Tubaltsev | H04L 45/02 370/254 |
| 2016/0119228 A1* | 4/2016 | Gao | H04L 47/2408 370/392 |

* cited by examiner

SOFTWARE FIB ARP FEC ENCODING

RELATED APPLICATIONS

Applicant claims the benefit of priority of prior, provisional application Ser. No. 62/214,724, filed Sep. 4, 2015, the entirety of which is incorporated by reference

FIELD OF INVENTION

This invention relates generally to data networking and more particularly to software for configuring application specific integrated circuits to forward network data.

BACKGROUND OF THE INVENTION

A forwarding information base (FIB) is a table or set of tables used to forward elements of network data (e.g., packets, frames, etc.) from ingress ports on a network element to a specific egress port on the network element. For multi-layer network elements (e.g., layer 3 switches) the FIB includes information such as data-link layer addresses (e.g., Ethernet media access control (MAC) addresses) and network layer addresses (e.g., Internet Protocol (IP) addresses). Multi-layer network elements routinely support multiple virtual local area networks (VLANs), each having a separate VLAN identifier (VLAN ID). Where network address translation (NAT) is enabled, transmission control protocol (TCP) or user datagram protocol (UDP) ports associated with the same IP address may be mapped to different egress ports on the network element. Accordingly, on some network elements and in some configurations, a large amount of memory may be consumed by the FIB, which can have performance limiting effects. This may be particularly relevant in datacenter environments in which a large number of VLANS are in use.

SUMMARY OF THE DESCRIPTION

Described herein are various embodiments of a network element to process routing entries in a forwarding information base (FIB) for hosts that are directly attached to a multi-layer network element to encode address resolution protocol (ARP) data into forwarding equivalence class (FEC) entries for the directly attached hosts.

One embodiment provides for a network element comprising a control plane including a forwarding agent and a data plane coupled to the control plane. The data plane can include a forwarding engine to forward a unit of network data from an ingress interface to an egress interface. The forwarding agent can be configured to program the forwarding engine with a forwarding information base having data-link layer forwarding data encoded into a network-layer forwarding entry.

One embodiment provides for a non-transitory machine-readable medium storing instructions which, when executed by one or more processors, cause the one or more processors to perform operations comprising deriving a layer 3 address from a layer 3 forwarding table entry in a forwarding information base (FIB) of a network element, deriving a layer 2 address from the layer 3 address and a virtual local area network (VLAN) identifier for a VLAN connected to the network element, deriving a physical port from the VLAN identifier and the layer 2 address, and defining a forwarding equivalence class (FEC) entry for the VLAN identifier, layer 2 address, and physical port.

One embodiment provides for a method of configuring a forwarding engine of a network element, where the method comprises deriving a layer 3 address from a layer 3 forwarding table entry in a forwarding information base (FIB) of the network element, deriving a layer 2 address from the layer 3 address and a virtual local area network (VLAN) identifier for a VLAN connected to the network element, deriving a physical port from the VLAN identifier and the layer 2 address, and defining a forwarding equivalence class (FEC) entry for the VLAN identifier, layer 2 address, and physical port.

For the various embodiments described, a network element includes any one or more of a router, switch, hub, bridge, gateway, or other infrastructure devices for a packet-forwarding network. Furthermore, a network element can be a physical or virtual device. Additionally, the network data includes various types of packet forwarding network data including packets, datagrams, frames, or other data types used within a packet-switched network.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
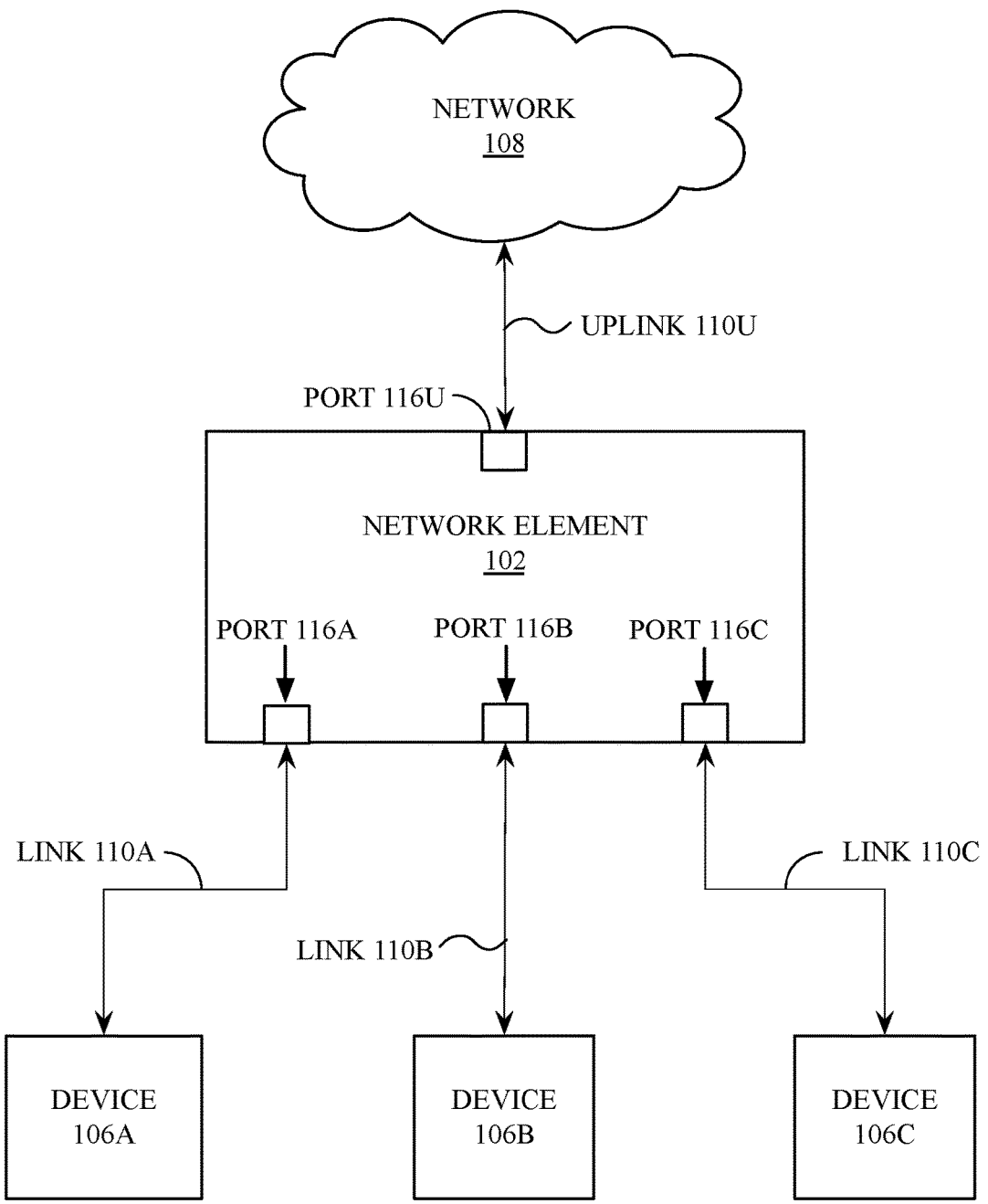
FIG. 1 is a block diagram of one embodiment of a system that includes a network element communicating network data between a network and a number of devices.

When using IP as a network layer protocol, a forwarding table entry for a directly attached host can include an entry having an IP address and an address prefix specifying an exact match requirement (e.g., /32 for IPv4 or /128 for IPv6). This indicates that individual elements of network data will be forwarded to the specified entry. Under some circumstances, for example, where multiple directly attached hosts reside on the same VLAN, which is serviced by a single egress port, multiple FIB entries may be created for each IP address within the VLAN, as each IP address can be listed in the FIB as a separate directly attached host which resolves to a separate forwarding equivalence class (FEC) entry, even though each of the separate FEC entries ultimately resolve to the same egress port.

A FEC describes a set of network data having similar and/or identical characteristics that may be forwarded in the same manner. For example, some network elements may include an FIB which defines an FEC ID to each group of IP packets that are forwarded in the same manner, meaning over the same path and with the same forwarding treatment (e.g., QoS characteristics, traffic class, etc.). Each prefix-defined route is assigned a separate FEC, even if multiple FECs resolve to the same next hop egress port because, even if the multiple prefix routes resolve to the same next hop, it cannot be assumed that each route will be forwarded in the same manner downstream. Thus, the FIB may become populated with multiple defined or discovered routes for multiple prefixes, where each route resolves to the same next hop egress port.

The large number of routes may cause the FIB to consume a large amount of memory to define each separate FEC. This may be particularly relevant in datacenter environments in which a large number of VLANS are in use. For example, for a network element having support for 500 VLANS, each VLAN having 100 hosts, the FIB may be populated with 50,000 individual FEC entries. In some network configurations, a large number of the FEC entries may resolve to the same next hop egress port.

In the specific scenario of multiple directly attached host entries on the same VLAN, FEC redundancy can be reduced by using a control plane forwarding agent to process the FIB to collapse multiple exact match routing table entries into a single forwarding equivalence class (FEC) entry. After processing, a single FEC can be defined for each VLAN on the network element, and each prefix on a VLAN that resolves to the same next hop egress port can be assigned to the single FEC for the VLAN.

In embodiments described herein, techniques are described to process routing entries in a forwarding information base (FIB) for hosts that are directly attached to a multi-layer network element to encode address resolution protocol (ARP) data into forwarding equivalence class (FEC) entries for the directly attached hosts. In one embodiment, the processing can condense the number of FEC entries in the FIB to one FEC per VLAN of the network element, significantly reducing the amount of memory consumed by the FIB. While the concepts described are similar to the use of FECs as labels for a prefix route, as in multi-protocol label switching (MPLS), the concepts described are not specific to MPLS or label switch routers (LSR), and may be applied to MPLS or non-MPLS network elements configured for multi-layer forwarding of network data.

To provide a thorough explanation of the various embodiments, numerous specific details are set forth herein. However, one having ordinary skill in the art will understand that embodiments may be practiced without these specific details. In some instances well-known components, structures, and techniques are not shown in detail to avoid obscuring key details within this description. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

Network System and Network Elements

The processes depicted in the figures that follow, are performed by processing logic that comprises hardware (e.g., circuitry, dedicated logic, etc.), software (such as is run on a general-purpose computer system or a dedicated or specialized machine), or a combination of both. Although some of the processes are described below in terms of sequential operations, it should be appreciated that some of the operations described may be performed in a different order. Moreover, some operations may be performed in parallel rather than sequentially.

FIG. 1 is a block diagram of one embodiment of a network system 100 that includes a network element 102 communicating network data between a network 108 and a number of devices 106A-C. In various embodiments, the network 102 is one or more of a switch, router, hub, bridge, gateway, etc., or any type of device that can provide access to a network 108 (e.g., physical network, virtualized network, etc.). In one embodiment, the network element 102 couples to the network 108 via an uplink 110U coupled to an uplink port 116U to provide network connectivity to devices 106A-C via respective links 110A-C coupled to ports 116A-C. The uplink port 116U and uplink 110U are generally configured for a high-speed wired connection (e.g., copper, fiber, etc.) that, in one embodiment, provides increased throughput capability relative to ports 116A-C and links 110A-C. The respective links 110A-C between the network element 102 and the devices 106A-C may also be wired connections. However, in some embodiments links 110A-C are created over alternate connection types such as wireless connections or a combination of wired and wireless connections.

In one embodiment, the device 106A-C is any type of device that can communicate network data with another device, such as a personal computer, laptop, or server. The devices 106A-C can also be a mobile device (e.g., phone, smartphone, personal gaming device, etc.), or another network element. In one embodiment, the devices 106A-C can each be a virtual machine or can be a device that hosts one or more virtual machines.

In various embodiments, different types of protocols can be used to communicate network data over the connection (e.g., Ethernet, wireless, Synchronous Optical Networking (SONET), Fiber channel, Infiniband, etc.). The network data being communicated by the network element 102 can be a stream of network frames, datagrams or data packets, or other types of discretely switched network data. In one embodiment, the network element 102 communicates network data between the devices 106A-C and the network 108 or between devices 106A-C using a variety of communicating techniques (e.g., layer 2 switching, layer 3 routing, traffic shaping, applying a quality of service (QoS) policy, etc.).

In one embodiment, the network element 102 is part of a region within a larger network topology, where the devices 106A-C are grouped within a separate network region as other devices coupled to the network 108. Network regions can be configured to allow the grouping of network endpoints, such as specific network stations, devices, trunks, media gateways, or protocol groups such as Internet Protocol groups within an enterprise network. Such regions may be defined physically, or can be defined virtually, via virtual networks that enable a virtual topology that differs from the physical topology of the network. Additionally, regions can be configured to have different parameters for processing and forwarding network data, such as differing audio parameters for a voice over IP network (VoIP), differing Quality of Service Parameters, or differing bandwidth limitations.

As described above, each of links 110A-C and uplink 110U have an associated physical link speed, where each physical link speed represents a maximum throughput for that link. The physical link speed for each link is generally deterministic and is based upon the physics of the physical medium and the length of the link. In one embodiment, variability in latency generally occurs in a network element due to the processing time involved in buffering, queuing, processing and forwarding network data from a source port to a destination port in that network element.

Figure 2:
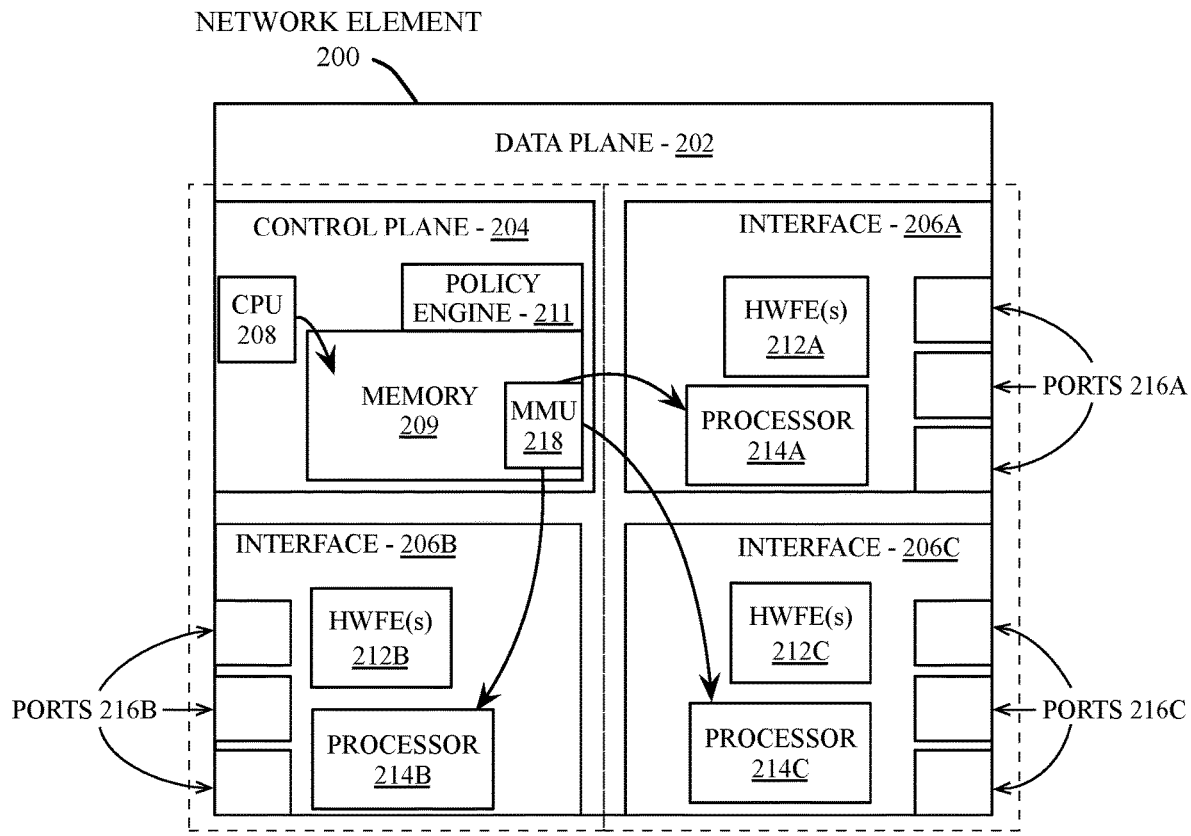
FIG. 2 is a block diagram of one embodiment of a network element including a data plane coupled to a control plane and several interface devices.

FIG. 2 is a block diagram of one embodiment of a network element 200 that includes a data plane 202 coupled to a control plane 204 and several interface devices 206A-C. In some network elements, the data plane 202 is referred to as the forwarding plane. In one embodiment, the illustrated network element 200 is a variant of the network element 102 of FIG. 1. In one embodiment, the control plane 204 includes central processing unit (CPU) 208 and memory 209 to store data. The CPU 208 is used to process information for the control plane 204 and writes configuration data for hardware forwarding engines 212A-C in the network interface devices 206A-C. Additionally, the CPU can read data from the hardware forwarding engines 212A-C. In one embodiment, the data plane 202 receives, processes, and forwards network data using various configuration data (e.g., forwarding, security, quality of service (QoS), and other network traffic processing information). The data plane 202 includes multiple network interface devices 206A-C (e.g., switches, routers, etc.) that can each receive, process, and/or forward network traffic. Each of the interface devices 206A-C includes multiple ports 216A-C that can be used to receive and transmit network data.

In one embodiment, for each received unit of network data, the data plane 202 determines a destination address for the network data, looks up the requisite information for that destination in one or more tables stored in the data plane, and forwards the data out the proper outgoing interface, for example, one of the interface devices 206A-C. In one embodiment, each interface device 206A-C includes one or more hardware forwarding engines (HWFE(s)) 212A-C, processor 214A-C, and ports 216A-C, respectively. Each hardware forwarding engine 212A-C forwards data for the network element 200, performing routing, switching, or other types of network forwarding. Each processor 214A-C can be used to accelerate various functions of the interface devices 206A-C. For example and in one embodiment, the processors 214A-C can program the hardware forwarding engines 212A-C. The processors 214A-C can also push data from the hardware forwarding engines 212A-C to a CPU 208 in the control plane 204.

In one embodiment, the control plane 204 gathers the configuration data for the hardware forwarding engines 212A-C from different sources (e.g., locally stored configuration data, via a command line interface, or other management channel (e.g., SNMP (Simple Network Management Protocol), Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and pushes this configuration data to the hardware forwarding engines 212A-C.

In one embodiment, the memory 209 that is used to store data for the control plane 204 is shared with the data plane 202. In such embodiment a memory management unit (MMU) 218 coupled to the memory 209 to allow processors 214A-C direct access to the memory 209. In one embodiment, the MMU 218 allows the processors 214A to directly access memory 209 without requiring the CPU 208 in the control plane 204 to send data to each processor 214A-C. In one embodiment, the control plane 204 includes a policy engine 211 to apply a QoS policy to network traffic flowing through the network element 200. The policy engine 211 can be configured to minimize the latency of some type of network traffic, or to apply traffic shaping policies on the overall flow of traffic through the network element, or within a larger network topology. Proper determination of real-time latency data within the network can be key to the implementation of effective QoS policy. In one embodiment, logic to perform the timing of network data flow is consolidated into the hardware of the data plane 202 of each network element 200.

Forwarding Engine Pipeline

Figure 3:
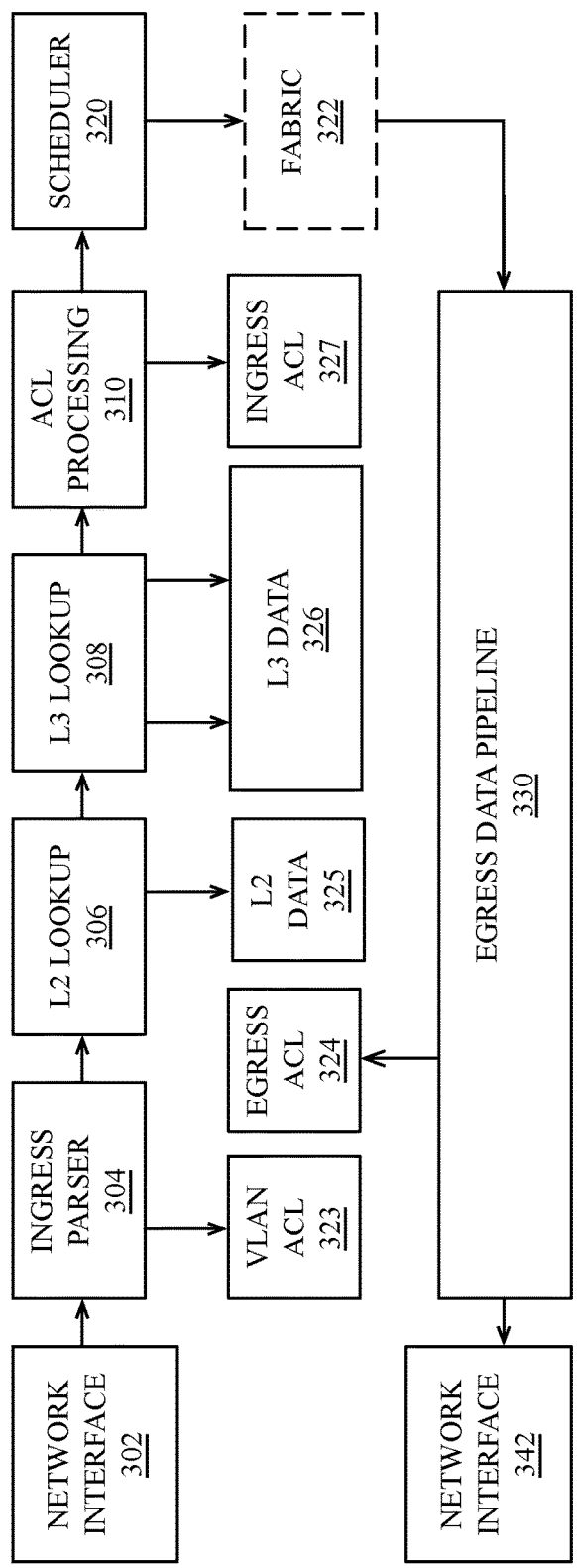
FIG. 3 is a block diagram of a forwarding pipeline within one embodiment of a network element.

FIG. 3 is a block diagram of a forwarding pipeline 300 within one embodiment of a network element. In one embodiment, the forwarding pipeline 300 resides in a hardware forwarding engine (e.g., HWFE 312), which includes logic from one or more of the HWFE(s) 212 within each interface 206 shown in FIG. 2. FIG. 3 focuses primarily on the ingress aspects of the forwarding pipeline 300, where the relevant logic of the various embodiments resides. As illustrated, the forwarding pipeline 300 includes an ingress network interface 302, an ingress parser 304, a data-link layer lookup (e.g., L2 lookup 306), a network layer lookup (e.g., L3 lookup 308), an access control list (ACL) processing block 310, and a scheduler 320.

Access control lists in the form of a VLAN ACL 323, Ingress ACL 327, and Egress ACL 324 allow policy and filtering actions to be performed on network data at multiple stages within the forwarding pipeline 300. L2 data 325 and L3 data 326 store various tables used to perform data-link layer (layer 2) and network layer (layer 3) forwarding by the forwarding pipeline 300. In one embodiment, after processing and forwarding operations are performed by ingress elements of the forwarding pipeline, the scheduler 320 forwards ingress network data to a fabric 322 module, which provides data-plane connectivity between multiple packet processors in the network element. In one embodiment a single chip solution is used for the ingress and egress pipelines of the forwarding pipeline 300, omitting the fabric module 322. Either through the fabric module 322 or via a scheduling engine, the scheduler 320 can forward the ingress network data to the egress data pipeline 330 for egress processing once the set of forwarding decisions have been made. The egress data, after processing by the egress data pipeline 330, is re-transmitted via an egress network interface 342.

In one embodiment, forwarding operations for a unit of network data proceed as follows. First, the network data is received by an ingress network interface 302. For embodiments including Ethernet interfaces, the network interface 302 includes a physical layer (PHY) and a media access control (MAC) layer. The PHY layer is responsible for transmission and reception of bit streams across physical connections including encoding, multiplexing, synchronization, clock recovery and serialization of the data on the wire for whatever speed/type of Ethernet interface is configured. Operation of the PHY complies with the IEEE 802.3 standard. The PHY layer transmits/receives the electrical signal to/from the transceiver where the signal is converted to light in the case of an optical port/transceiver. In the case of a copper (electrical) interface, e.g., Direct Attach Cable (DAC), the signals are converted into differential pairs.

If a valid bit stream is received at the PHY, the data is sent to the MAC layer. On input, the MAC layer is responsible for turning the bit stream into frames, packets, or another division of network data based on the supported and implemented protocols and standards of the network element. This operation can include performing error checking and finding the start and end delimiters for the unit of network data. In one embodiment, while the entire unit of network data is received at the MAC/PHY layer only header data is sent through to the remainder of the forwarding pipeline 300.

In one embodiment, headers for the unit of network data are parsed at an ingress parser 304, which extracts key fields used to make forwarding decisions. For a typical unit of Internet Protocol version 4 (IPv4) network data, the ingress parser 304 can extract a variety of layer 2, layer 3, and layer 4 headers, including source and destination MAC addresses, source and destination IP addresses, and source and destination port numbers. In one embodiment, the ingress parser 304 also determines the VLAN ID of the unit of network data. Where the unit of network data has arrived via a trunk port, the VLAN ID can be determined based on a VLAN header. When the unit of network data arrives via an access port or arrived untagged, the VLAN ID may be determined based on the port configuration.

In one embodiment, once the ingress parser 304 is aware of the VLAN ID and ingress interface the ingress parser 304 verifies the spanning tree protocol (STP) port state for the receiving VLAN. In one embodiment, the network element supports the rapid spanning tree protocol (RSTP). If the port STP/RSTP state indicates that the unit of network data should be forwarded (e.g., blocking, listening, discarding, learning, etc.) the unit of network data is dropped. If the STP/RSTP state is learning, the MAC address table is populated with information from the unit of network data and the unit of network data is dropped. If the port STP state is forwarding, then the headers for the unit of network data are allowed to proceed down the pipeline.

In one embodiment, the ingress parser 304 can perform a further comparison for the unit of network data against any configured Port ACLs by performing a lookup in the VLAN ACL 323. If the unit of network matches a DENY statement the unit will be dropped. If the unit of network data matches a PERMIT statement, or no port ACL is applied, then the unit of network data is passed to the next block of the pipeline. Successive stages include L2 lookup 306 and an L3 lookup 308 stages. The L2 lookup 306 stage will reference L2 data 325, which may be a MAC address table, which is an exact-match table. The L3 lookup 308 will reference L3 data 326, which includes an exact-match table that contains/32 IPv4 and /128 IPv6 host routes, and a longest-prefix match (LPM) table that contains IPv4 and IPv6 routes that are not host routes.

Exemplary FIB and FIB ARP FEC Encoding Optimization

The L2 data 325 and L3 data 326 include FIB data described herein. In one embodiment, the MAC address table of the L2 data 325 and the exact match host route table of the L3 data 326 can be significantly reduced in size via ARP FEC encoding provided by embodiments described herein. More precisely, in the specific scenario of multiple directly attached host entries on the same VLAN, FIB redundancy can be reduced by altering the FIB and associated forwarding agent to collapse multiple exact match routing table entries into a single forwarding equivalence class (FEC) entry.

Figure 4A:
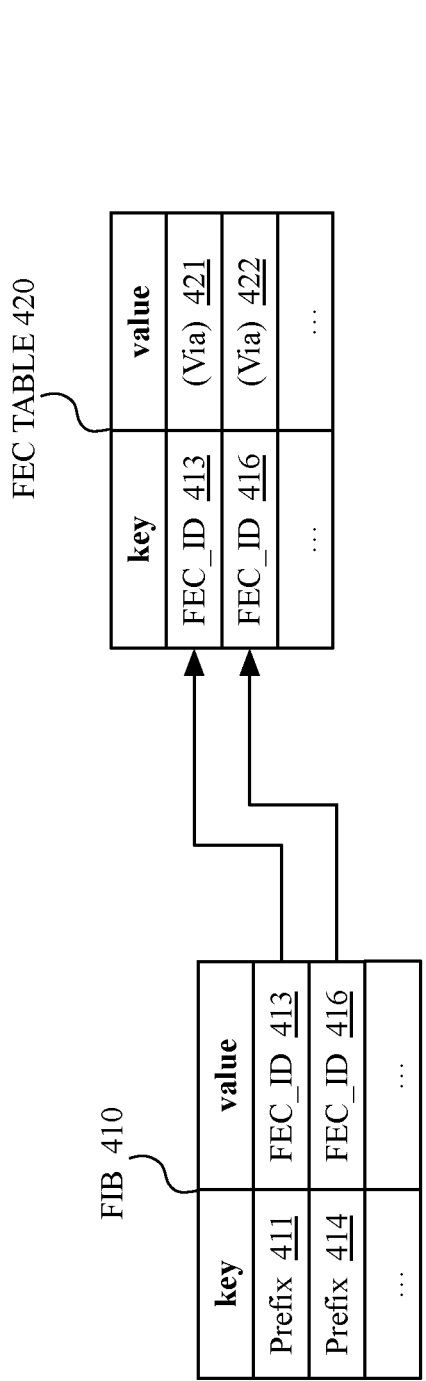
FIGS. 4A-B are block diagrams of exemplary forwarding tables used within a network element.
Figure 4B:
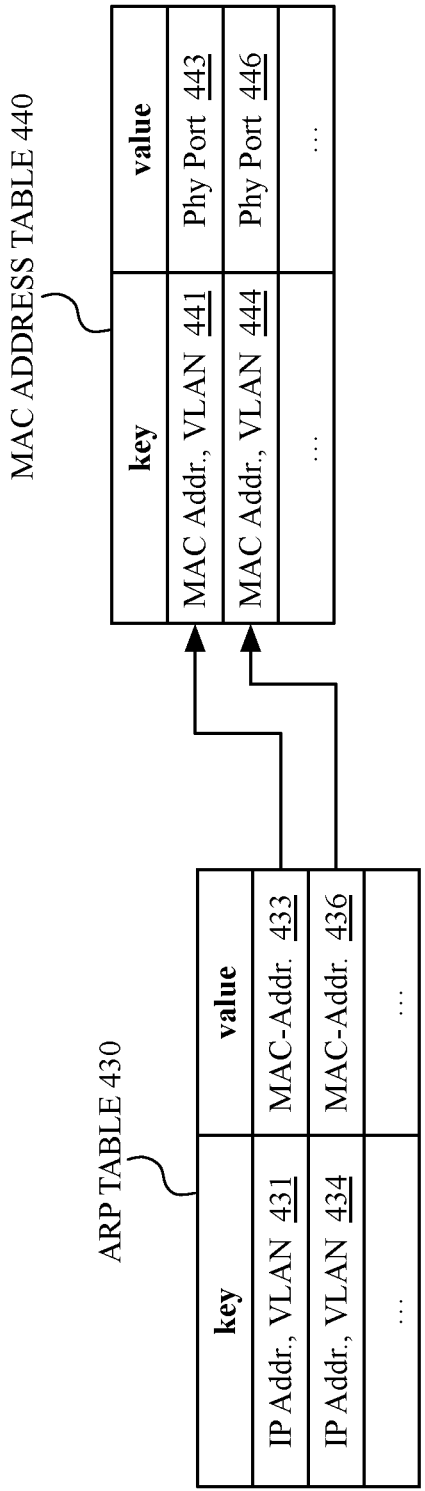

FIGS. 4A-B are block diagrams of exemplary forwarding tables used in a network element. FIG. 4A shows an FIB 410 that includes entries in which specific Prefix and VLAN_ID pairings are associated with a FEC_ID. The FIB 410 is used to determine the 'Next Hop" for a unit of network data flowing through the network element. Using the FIB 410 illustrated, ingress network data matching a first prefix 411 and having a first VLAN_ID 412 is classified as belonging to a first FEC having FEC_ID 413. Ingress data matching a second prefix 414 and having a second VLAN_ID 415 is classified as belonging to a second FEC having FEC_ID 416. The FEC_IDs 413, 416 can be resolved using an FEC table 420. For example, FEC_ID 413 can resolve to a first via 421. FEC_ID 416 can resolve to a second via 422. Each via 421, 422 can have an associated network layer address (e.g., IP address) and VLAN ID, which specifies the next hop to which the network data unit is to be forwarded.

For Ethernet data-link layer networks, the next hop can be resolved to a MAC address via an ARP table 430 shown in FIG. 4B. The ARP table 430 is keyed by an IP address and VLAN combination 431, 434, each of which resolves to a specific MAC-address 433, 436. The ARP table 430 is filled using dynamically by learning the MAC addresses of IP addresses received on each VLAN, and via the use of the address resolution protocol (ARP). The specific physical port 443,446 though which the host having the listed MAC address may be accessed can be defined by a MAC address table 440. The mac address table 444 can include a MAC address to interface/port mapping, which can be separately defined for each MAC Address, VLAN pair 441, 444.

Embodiments described herein provide for an optimization of the FIB 410 for directly attached hosts on a multi-layer network element where all hosts on a specific VLAN resolve to the same next hop. In one embodiment a new route type, "attached" is provided to define a specific route entry for a directly attached host. For attached route types, all network-layer address entries associated with a specific VLAN_ID can be automatically resolved to a specific FEC_ID. In this configuration, the FIB 410 can be populated with a single FEC_ID per VLAN_ID, such that all network data element belonging to a specific VLAN_ID can be resolved to a specific FEC_ID without including redundant entries for each address or prefix on the VLAN, which would otherwise resolve to separate FEC_IDs that, in turn, ultimately resolve to the same egress port.

In one embodiment, to derive the updated table, forwarding agent software executing on a control plane processor of the network element can combine the tables listed above and derive an optimized FIB that contains ARP FEC information for each attached route, including a VLAN, MAC Address, and port. The derived table can then be programmed to a forwarding ASIC in the data plane of the network element, where the forwarding agent performs all forwarding operations in hardware. FIB ARP FEC encoding of an exemplary embodiment is shown in FIG. 5.

Figure 5:
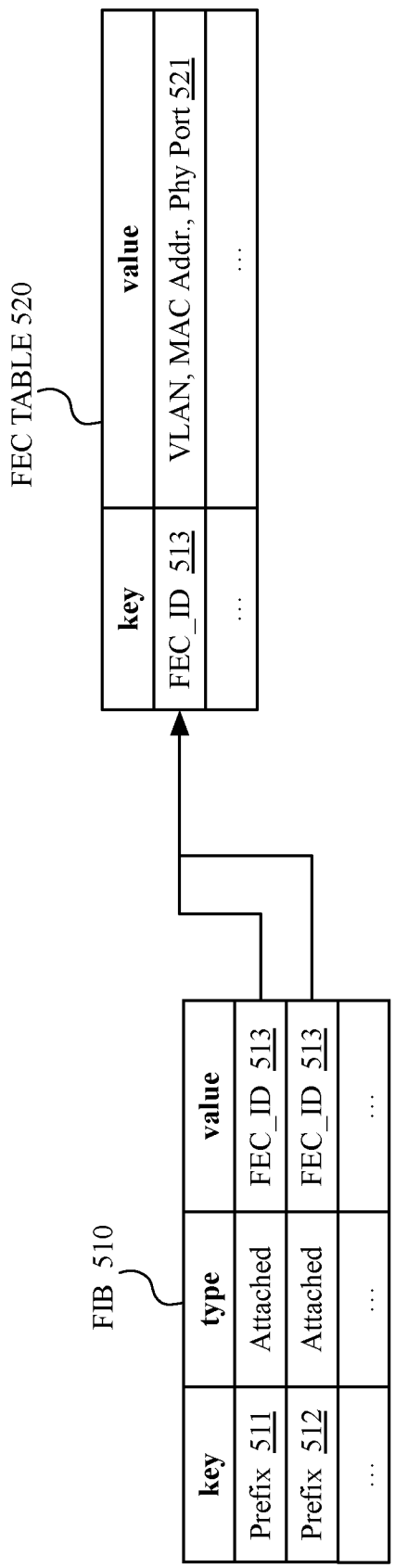
FIG. 5 is a block diagram of FIB ARP FEC encoding, according to an embodiment.

FIG. 5 is a block diagram of FIB ARP FEC encoding 500, according to an embodiment. As illustrated, an optimized FIB 510 includes multiple prefix-based routes (e.g., prefix 511, 512), which are defined as attached routes. The attached route indicates that the route is for a specific, directly attached host. In the case of directly attached routes, each prefix is a /32 or /128 prefix for IPv4 and IPv6 respectively, indicating that the route is for a single, specific IP address. As show in FIB 510, multiple attached prefixes can be assigned the same FEC_ID 513, rather than having a separate FEC for each prefix. The optimized FEC table 520 includes, for each FEC_ID 513, a value that specifies a VLAN, MAC Address, and Physical Port 521. The optimized ARP FEC encoding show in FIG. 5 can be of particular relevance when used in the multi-layer forwarding environment shown in FIG. 6.

Figure 6:
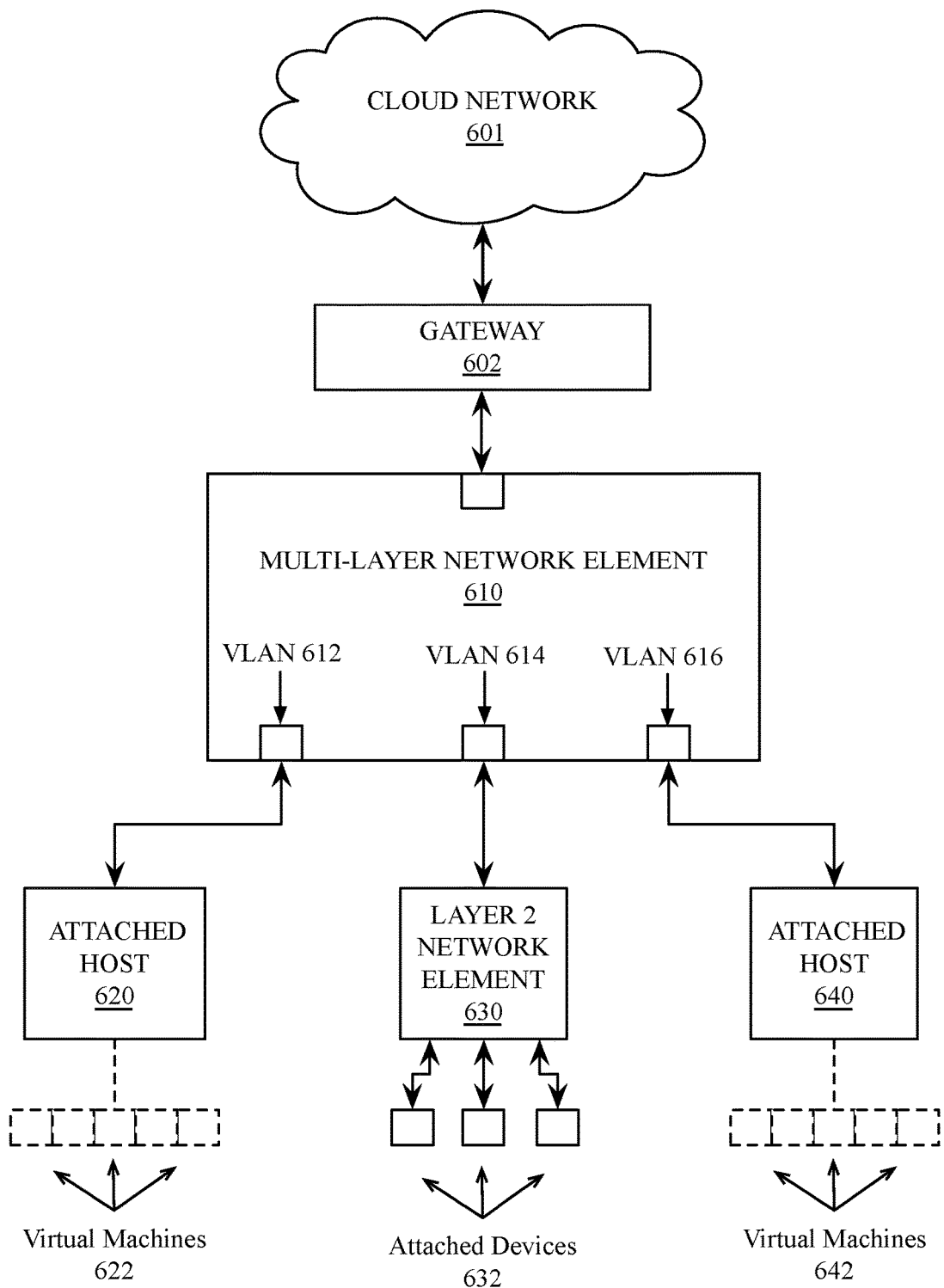
FIG. 6 is a block diagram of an exemplary multi-layer forwarding environment.

FIG. 6 illustrates and exemplary multi-layer forwarding environment 600, according to an embodiment. In the illustrated multi-layer forwarding environment, a multi-layer network element 610 couples to a cloud network 601 via a gateway 602. The multi-later network element 610 additionally couples to multiple attached hosts 620, 640, as well as a layer 2 network element (e.g., Ethernet switch) which couples a set of attached devices 632 (e.g., blade servers, workstations, etc.) to the network. In one embodiment, the attached hosts 620, 640 can host multiple virtual machines 622, 642. Each VLAN 612-616 illustrated is associated with a single physical port on the multi-layer network element 610, although one or more of the VLANs 612-616 may share a VLAN ID, which would combine the physically separate layer 2 subnets into a single virtual subnet. For IP/Ethernet networks, each of the virtual machines 622, 642 and devices 632 can have separate IP addresses and MAC addresses, although duplicate MAC addresses or IP addresses may be allowed for devices 632 or virtual machines 622, 642 having different VLAN IDs.

Using the FIB ARP FEC encoding 500 of FIG. 5, a forwarding agent can derive optimized routes to attached host 620-640 and devices 632. Rather than populating a FIB with a separate FEC per IP address for each directly attached layer 3 host 620, 640 or device 632, each route is defined using one FEC per VLAN 612-616, as it can be determined that any traffic to be forwarded for a specific FEC_ID will be forwarded on a specific VLAN, and likely to a specific MAC address, which is accessible via a specific port.

In the event multiple ports share a VLAN ID and it cannot initially be determined through which port to forward a unit of network data, the network data can be flooded to all VLAN ports, or at least to all VLAN ports sharing the same VLAN ID if the VLAN ID for the unit of network data is known. The FEC table can then be updated once a determination can be made as to which MAC addresses are associated with which VLAN, and a separate FEC can then be defined for each VLAN sharing the VLAN ID to avoid flooding all VLAN ports.

Figure 7:
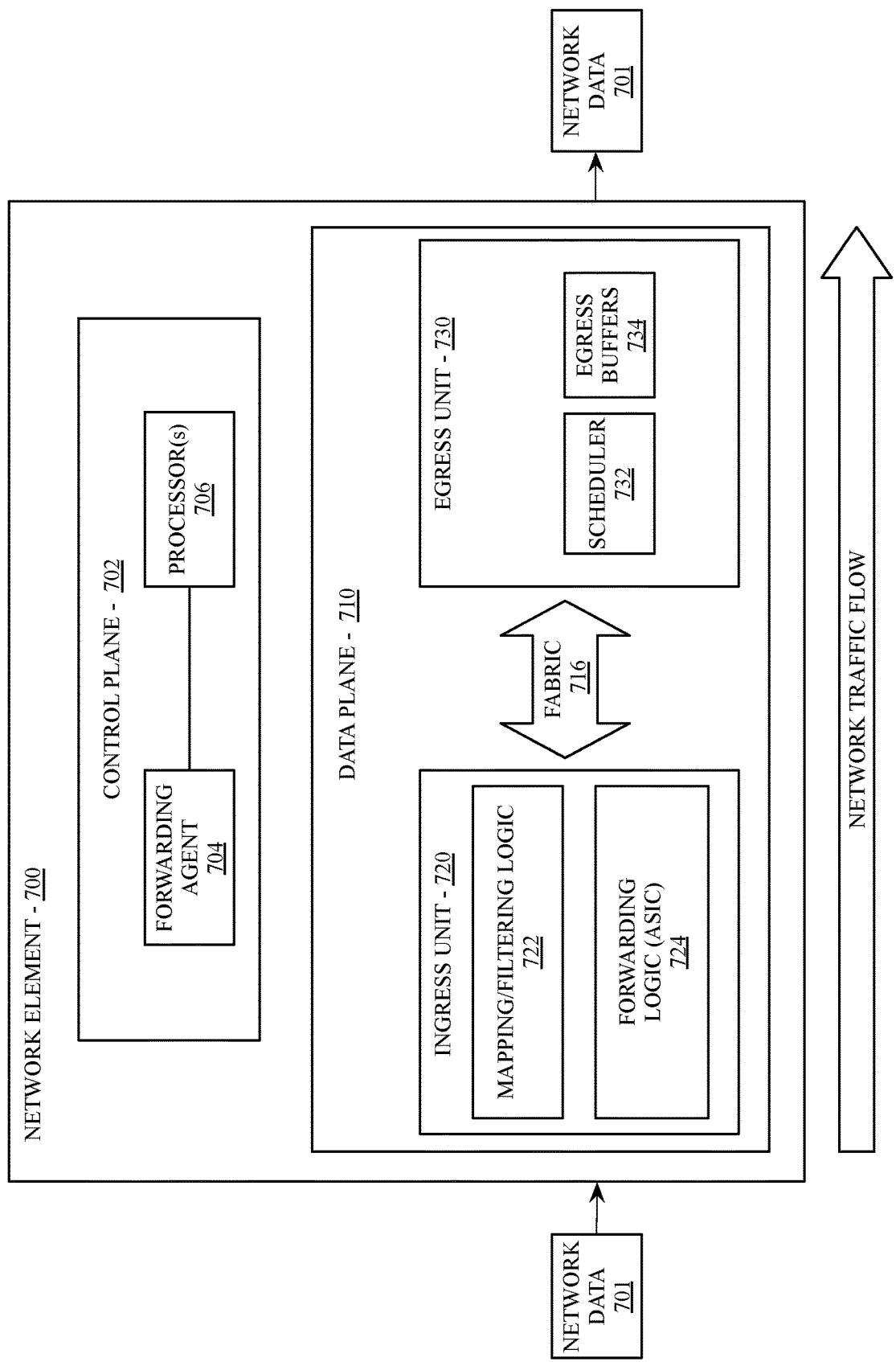
FIG. 7 is a block diagram of a network element configured to perform FIB ARP FEC encoding, according to an embodiment.

FIG. 7 illustrates logic within a further embodiment that provides for a network element 700 configured to perform FIB ARP FEC encoding. In such embodiment, the network element 700 includes a data plane 710 coupled to a control plan 702 having one or more processor(s) 706 and a forwarding agent 704. In one embodiment, the forwarding agent 704 is at least in part a software process executing on the one or more processor(s) 706 of the control plane 702. The processor(s) 706 are dedicated to control plane operations including programming one or more hardware forwarding engines, (e.g., HWFE(s) 206A-C of FIG. 2) such that all forwarding operations for network data occur on the data plane 710. In one embodiment, the forwarding agent 704 can uses the processor(s) 706 to process FIB information to perform ARP FEC encoding as described herein. The optimized FIB can then be programmed to the forwarding engines in the data plane 710.

In one embodiment, the data plane 710 includes an ingress unit 720 and an egress unit 730, which may include logic to perform equivalent operations as those illustrated and described with respect to the forwarding pipeline 300 of FIG. 3. The ingress unit 720 includes various network interfaces and ports (not shown) to receive and process various data headers on units of incoming network data 701, and mapping/filtering logic 722 to process incoming data according to access control list entries and perform address lookups into the forwarding tables provided by the forwarding agent 704. Forwarding logic 724 in the ingress unit 720 of the data plane 710, which may be an application specific integrated circuit (ASIC), is configured to perform line rate forwarding operations to the output ports indicated by the forwarding tables.

In one embodiment, after an output port is determined for forwarded network data 701, the data may be buffered before being forwarded to the egress unit (e.g., egress unit 730) associated with the destination port, for example, across a crossbar fabric 716. The exemplary egress unit 730, in one embodiment, includes a scheduler 732 to grant scheduling credits to enables the ingress unit 720 to forward units of network data 710 to the egress unit 730. The units of network data 710 may be buffered in egress buffers 734 of the egress unit 730 before the network data 701 is transmitted via a destination port of the network element 700.

Figure 8A:
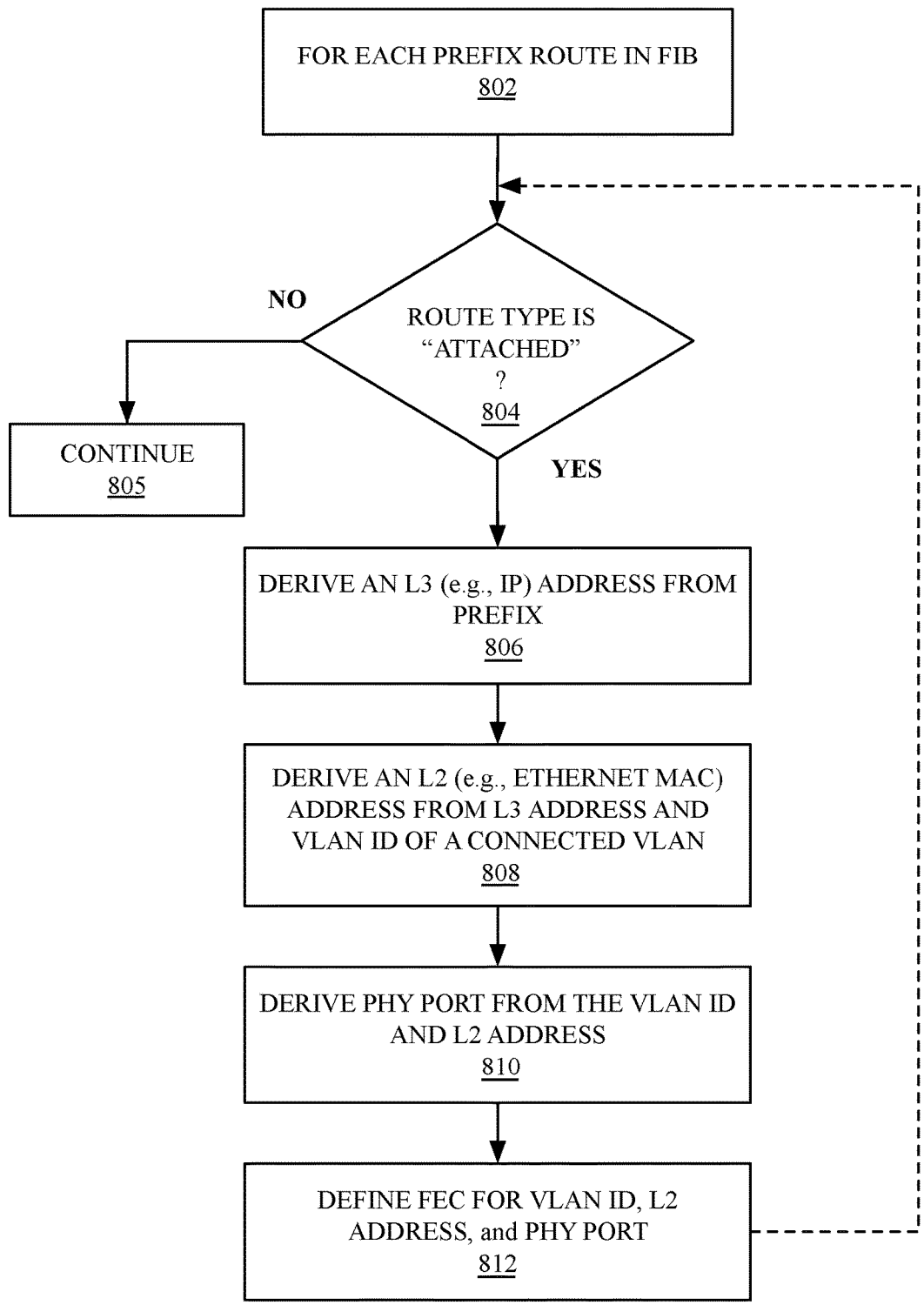
FIGS. 8A-B are flow diagrams of logic to perform FIB ARP FEC encoding and program a forwarding engine with an optimized FIB.
Figure 8B:
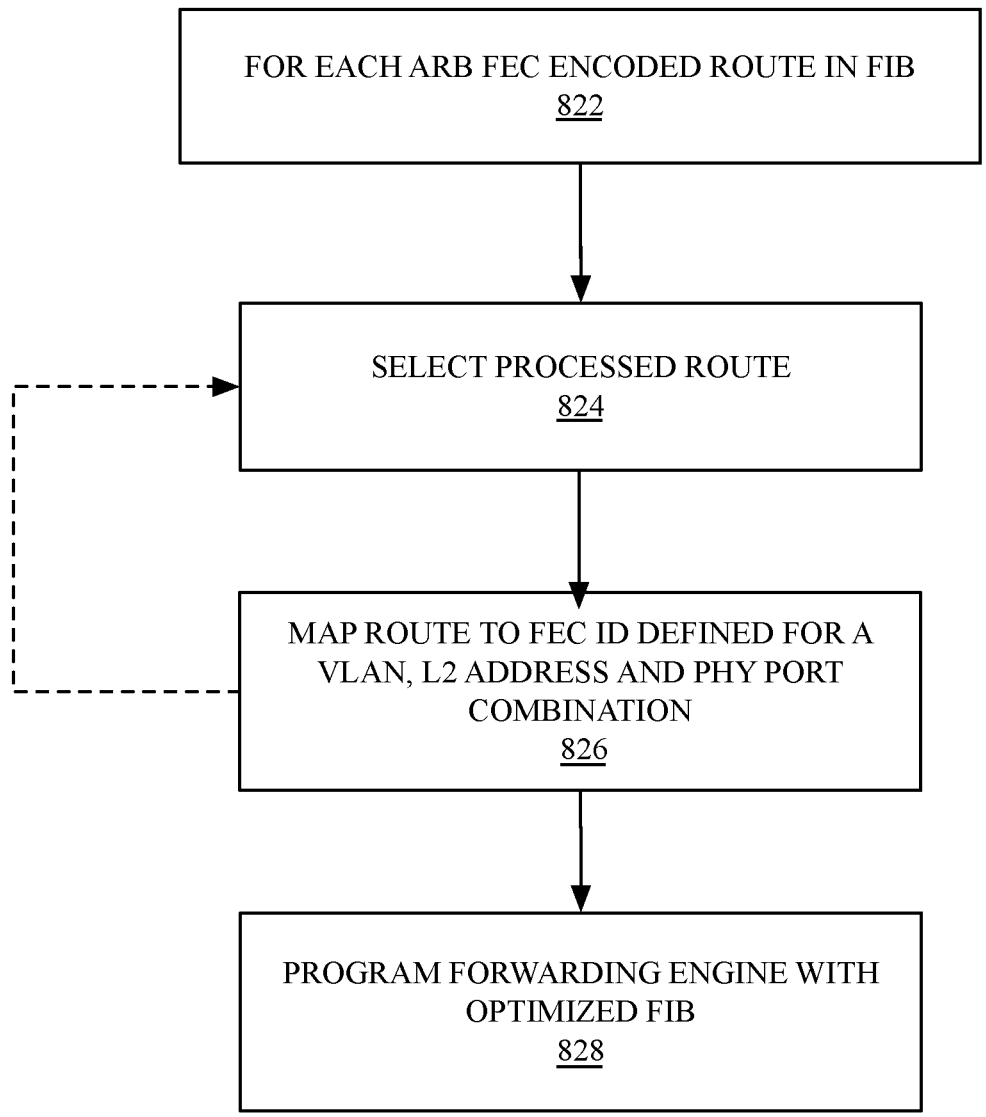

FIGS. 8A-B are flow diagrams of logic to perform FIB ARP FEC encoding and to program a forwarding engine with an optimized FIB, according to an embodiment. FIG. 8A illustrates exemplary FIB ARP FEC encoding logic 800, which may be performed by a forwarding agent or an equivalent control plane element of a network. In one embodiment, as shown at block 802, the logic 800 is performed for each prefix route in the FIB. For each route, the logic 800 determines whether the route type is an "attached" type, as shown at block 804. For a route that is not the "attached" type, the logic 800 continues to the next prefix route at block 805. While a specific route type is specified for the operations of the logic 800 illustrated, it will be understood that the operations illustrated may be performed for any route type which requires an exact match to a complete network layer (e.g., L3) address, including any directly connected route having an IPv4/32 prefix, or an IPv6/128 prefix.

At block 806, for the appropriate route types, the logic 800 can derive an L3 (e.g., IP) address from the route prefix, which is an IPv4/32 prefix, or an IPv6/128 prefix. At block 808, the logic 800 can derive an L2 (e.g., Ethernet MAC) address from an L3 address and VLAN ID of a connected VLAN. At block 810, the logic 800 can derive a physical (PHY) port from the VLAN ID and the L2 address. In one embodiment the derivation at block 810 can be performed using multiple tables, including an ARP table 430 and mac address table 440 as shown in FIG. 4B. However, other tables FIB structures storing the relevant data may be used. At block 812, the logic 800 can define a FEC (forward equivalence class) for the VLAN ID, L2 address and physical port combination. In one embodiment, the logic 800 can define a FEC entry for each VLAN, L2 address and physical port combination in the FIB. The operations shown at block 804-812 can be repeated for each prefix route in the FIB. In one embodiment, the processing results in an FIB that includes a single FEC entry per connected VLAN in the FIB.

In one embodiment, the FEC defined at block 812 is a condensation of multiple lookup tables and results in the condensation of multiple individual FIB entries into a single entry. As discussed with respect to FIG. 6, for IP/Ethernet networks, where multiple hosts reside behind a single, directly attached host having a prefix route that resolves to a single IP address, route discovery may result in the creation of multiple FIB entries for each of the multiple IP addresses that all resolve to the same next hop, even though a separate FEC is defined for each route. Under some circumstances, for example, where multiple directly attached hosts reside on the same VLAN, which is serviced by a single egress port, multiple FIB entries may be created for each IP address within the VLAN, as each IP address can be listed in the FIB as a separate directly attached host which resolves to a separate FEC entry, even though each of the separate FEC entries ultimately resolve to the same egress port. Each of the virtual machines 622, 642 and devices 632 can have separate IP addresses and MAC addresses, although duplicate MAC addresses or IP addresses may be allowed for devices 632 or virtual machines 622, 642 having different VLAN IDs.

Using the FIB ARP FEC encoding 500 of FIG. 5, a forwarding agent can derive optimized routes to attached host 620-640 and devices 632. Rather than populating a FIB with a separate FEC per IP address for each directly attached layer 3 host 620, 640 or device 632, each route is defined using one FEC per VLAN 612-616, as it can be determined that any traffic to be forwarded for a specific FEC_ID will be forwarded on a specific VLAN, and likely to a specific MAC address, which is accessible via a specific port.

FIG. 8B illustrates exemplary forwarding agent logic 820 to program a forwarding engine with an optimized FIB. In one embodiment, forwarding agent logic 820 is performed by software logic executing on one or more processors of a network element control plane. In one embodiment, one or more additional hardware processing elements may assist with performing the forwarding agent logic 820.

In one embodiment, as shown at block 822, forwarding agent logic 820 is performed for each ARB FEC encoded route in the FIB. At block 824, the logic 820 can select a processed route, which is a route that has been processed by the FIB ARB FEC encoding logic 800 of FIG. 8A. The processed routes can include attached routes, host routes, or any other direct route to a specific network layer address. At block 826 the attached routes can be mapped to a FEC ID defined for a VLAN, L2 address and physical port combination at block 812 of FIG. 8A. The operations shown at block 824-826 can be repeated for each ARB FEC encoded route in the FIB. Once all, or a sufficient number of routes have been mapped, the logic 820 can program the forwarding engine with the optimized FIB at block 828.

Exemplary Data Processing System and Modular Network Element

Figure 9:
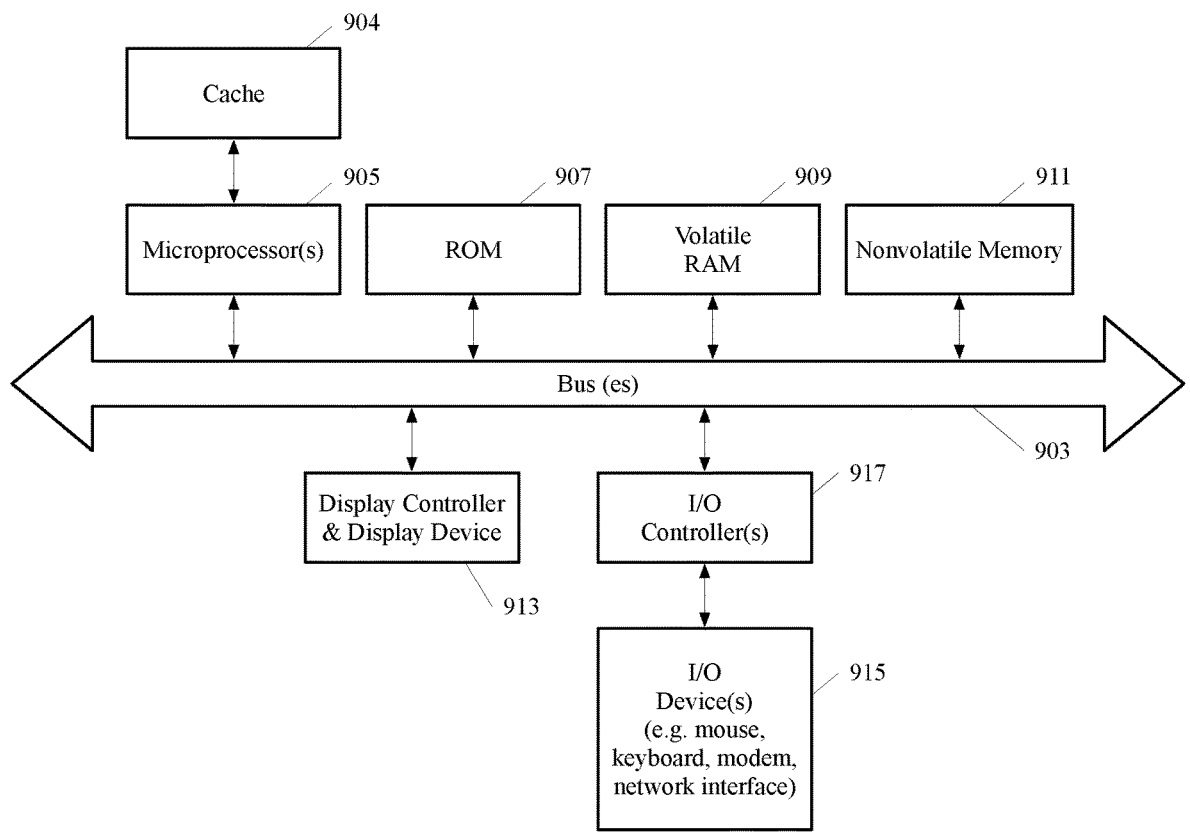
FIG. 9 shows one example of a data processing system, which may be used with one embodiment of the present invention.

FIG. 9 shows one example of a data processing system 900, which may be used with one embodiment of the present invention. For example, the data processing system 900 may be implemented including one or more of network element 102 as in FIG. 1 or network element 200 as in FIG. 2. In one embodiment, the data processing system 900 is used within the control plane of a network element described herein. Note that while FIG. 9 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

The data processing system 900 includes one or more bus(es) 903 which couple to one or more microprocessor(s) 905, ROM (Read Only Memory) 907, volatile RAM 909 and a non-volatile memory 911. In one embodiment, the one or more microprocessor(s) 905 couple to a cache 904, which can include one or more sets of instruction and/or data caches. The bus(es) 903 may include one or more buses connected to each other through various bridges, controllers and/or adapters as is well known in the art.

The microprocessor(s) 905 may retrieve the instructions from the memories 907, 909, 911 and execute the instructions to perform operations described above. Instructions and/or associated data retrieved from the memories 907, 909, 911 may be stored in the cache 904. The bus(es) 903 interconnect system components with each other, and to a display controller and display device 913, and to peripheral devices such as input/output (I/O) devices, which may be mice, keyboards, modems, network interfaces, printers and other devices well known in the art. Typically, the input/output devices 915 are coupled to the system via input/output controller(s) 917. The volatile RAM (Random Access Memory) 909 is typically implemented as dynamic RAM (DRAM), which requires power continually in order to refresh or maintain the data in the memory, but may also include static ram (SRAM), which does not require a periodic refresh.

In one embodiment, the non-volatile memory 911 is used at least in part as mass storage, which typically includes one or more of a magnetic hard drive, a magnetic optical drive, an optical drive, flash memory, or other types of memory systems, which maintain data after power is removed from the system. Typically, the mass storage portion of the non-volatile memory 911 will also be a random access memory although this is not required. While FIG. 9 shows that the non-volatile memory 911 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine-readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 10:
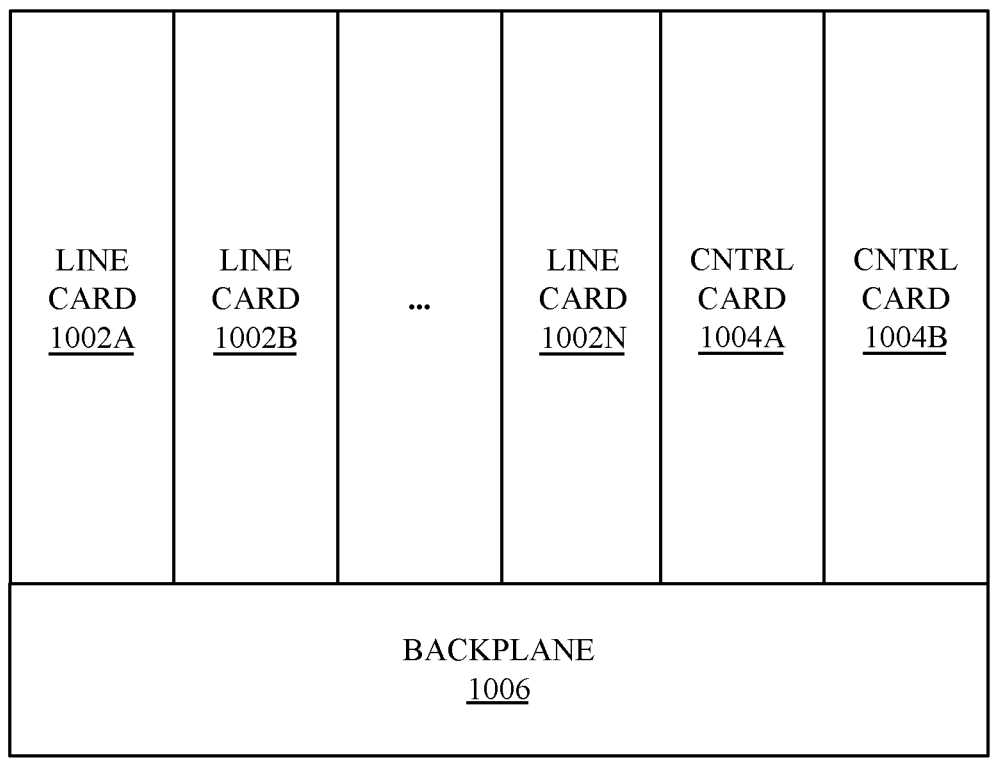
FIG. 10 is a block diagram of an additional embodiment of an exemplary network element as described herein.

FIG. 10 is a block diagram of an additional embodiment of an exemplary modular network element 1000 as described herein. In one embodiment, the network element has a modular and expandable configuration that allows the addition or removal of resources configured as line cards 1002A-N, or controller cards 1004A-B coupled to a backplane 1006. In one embodiment, the controller cards 1004A-B control the processing of the traffic by the line cards 1002A-N, which can each include one or more network data forwarding devices such as interfaces 206A-C as in FIG. 2, although the precise nature of the forwarding devices is not limited as such. In addition, the controller card 1004A-B can collect and possibly aggregate timing data as described in FIG. 9 above. In one embodiment, the line cards 1002A-N process and forward traffic according to the network policies received from controller cards the 1004A-B. In one embodiment, one or more of the line cards 1002A-N can monitor and report internal performance data, such as latency data for all or selected units of network data traversing the network element. In one embodiment, the controller cards 1004A-B can also be configured to perform all or a sub-set of functions provided by the line cards 1002A-N. It should be understood that the architecture of the network element 1000 illustrated in FIG. 10 is exemplary, and different combinations of cards may be used in other embodiments.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "measuring," "receiving," "determining," "transmitting," "sending," "forwarding," "detecting," "gathering," "dropping," "communicating," "canceling," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description above. In addition, software aspects of the various embodiments are not described with reference to any particular programming language. It will be appreciated that a variety of programming languages may be used to implement the teachings described herein.

In the description above and in the claims below, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the terms "server," "client," and "device" are intended to refer generally to data processing systems rather than specifically to a particular form factor for the server, client, and/or device.

Specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Additionally various components described herein can be a means for performing the operations or functions described in accordance with an embodiment.

One embodiment provides for a network element comprising a control plane including a forwarding agent and a data plane coupled to the control plane. The data plane can include a forwarding engine to forward a unit of network data from an ingress interface to an egress interface. The forwarding agent can be configured to program the forwarding engine with a forwarding information base having data-link layer forwarding data encoded into a network-layer forwarding entry.

In one embodiment the data-link layer forwarding data is derived from an address resolution protocol table. In one embodiment the network-layer forwarding entry is a forwarding equivalence class (FEC) entry. In a further embodiment, the forwarding equivalence class entry is associated with a specific virtual local area network (VLAN), media access control (MAC) address, and physical port. In a further embodiment the network layer forwarding entry associates an Internet Protocol (IP) prefix with a forwarding equivalence class entry. In one embodiment the IP prefix is a direct match for a specific IP address, such as an IPv5/32 prefix, or an IPv6/128 prefix.

In one embodiment, the control plane of the network element includes one or more processors and the forwarding agent is to cause the one or more processors to derive an IP address from the prefix, derive an Ethernet address from the IP address and a VLAN ID, derive a physical port from the VLAN ID and the Ethernet address, and define a FEC identifier for the combination of the VLAN, Ethernet address and physical port.

One embodiment provides for a non-transitory machine-readable medium storing instructions which, when executed by one or more processors, cause the one or more processors to perform operations comprising deriving a layer 3 address from a layer 3 forwarding table entry in a forwarding information base (FIB) of a network element, deriving a layer 2 address from the layer 3 address and a virtual local area network (VLAN) identifier for a VLAN connected to the network element, deriving a physical port from the VLAN identifier and the layer 2 address, and defining a forwarding equivalence class (FEC) entry for the VLAN identifier, layer 2 address, and physical port.

In a further embodiment, the FIB includes a single FEC entry per VLAN and the medium includes further instructions defining the FEC entry for a specific route type in the FIB. The specific route type may be an attached route type specified as a route type for a directly attached host of the network element, which may have a route specified by an IPv4/32 prefix or an IPv6/128 prefix. In a further embodiment, the medium includes instructions to perform further operations comprising creating an updated FIB by mapping each attached route in the FIB to a corresponding FEC entry and programming a forwarding engine of the network element with the updated FIB.

One embodiment provides for a method of configuring a forwarding engine of a network element, where the method comprises deriving a layer 3 address from a layer 3 forwarding table entry in a forwarding information base (FIB) of the network element, deriving a layer 2 address from the layer 3 address and a virtual local area network (VLAN) identifier for a VLAN connected to the network element, deriving a physical port from the VLAN identifier and the layer 2 address, and defining a forwarding equivalence class (FEC) entry for the VLAN identifier, layer 2 address, and physical port.

In a further embodiment, the method additionally comprises deriving a forwarding equivalence class entry for each forwarding entry in the forwarding information base (FIB) of the network element that specifies a directly attached host, the directly attached host having an forwarding entry specifying an IPv4/32 prefix or an IPv6/128 prefix. IN a further embodiment, the method additionally comprises creating an updated FIB by mapping the forwarding entry for each directly attached host to a corresponding FEC entry and programming the forwarding engine of the network element with the updated FIB. In one embodiment the FIB includes a single FEC entry per VLAN.

While the foregoing discussion describes exemplary embodiments of the present invention, one skilled in the art will recognize from such discussion, the accompanying drawings, and the claims, that various modifications can be made without departing from the spirit and scope of the invention. Therefore, the illustrations and examples herein should be construed in an illustrative, and not a restrictive sense. The scope and spirit of the invention should be measured solely by reference to the claims that follow.

What is claimed is:

1. A network device, comprising:
   a memory; and
   a processing device coupled to the memory, the processing device to:
      program a forwarding engine of a data plane with forwarding information, wherein the forwarding information comprises:
         a forwarding information base comprising a plurality of forwarding entries; and
         a forwarding equivalence class (FEC) table comprising a plurality of FEC entries, wherein:
            data link layer forwarding data is encoded into the FEC entries;
            each forwarding entry in the forwarding information base is associated with a corresponding FEC entry; and
            each FEC comprises an identifier for a virtual network.

2. The network device of claim 1, wherein each forwarding entry comprises:
   an Internet Protocol (IP) prefix; and
   a route type associated with the IP prefix.

3. The network device of claim 2, wherein each forwarding entry associates a respective prefix with the corresponding FEC entry.

4. The network device of claim 2, wherein each forwarding entry further comprises:
   an identifier for the corresponding FEC entry.

5. The network device of claim 2, wherein:
   the route type comprises an attached route type;
   the attached route type is for a host that is coupled to a port of the network device.

6. The network device of claim 1, wherein the FEC includes a single FEC entry per virtual network.

7. The network device of claim 1, wherein the data link layer forwarding data is derived from an address resolution protocol table.

8. The network device of claim 1, wherein each FEC entry is further associated with a media access control (MAC) address and a physical port.

9. The network device as in claim 6, wherein to program the forwarding engine of the data plane with the forwarding information, the processing device is further to:
   derive an IP address based on an IP prefix;
   derive an Ethernet address from the IP address and a virtual network identifier;
   derive a physical port from the virtual network identifier and the Ethernet address.

10. The method of claim 1, wherein at least one FEC entry is associated with multiple forwarding entries.

11. The network device of claim 1, wherein the memory and the processing device are included in a control plane of the network device.

12. The network device of claim 1, wherein the forwarding engine is to forward a unit of network data based on the forwarding information base and the FEC table.

13. A method, comprising:
   programming a forwarding engine of a data plane with forwarding information, wherein the forwarding information comprises:
      a forwarding information base comprising a plurality of forwarding entries;
      and a forwarding equivalence class (FEC) table comprising a plurality of FEC entries, wherein:

data link layer forwarding data is encoded into the FEC entries;

each forwarding entry in the forwarding information base is associated with a corresponding FEC entry; and each FEC entry comprises an identifier for a virtual network; and forwarding network data based on the forwarding information.

14. The method of claim 13, wherein each forwarding entry comprises:

an Internet Protocol (IP) prefix; and a route type associated with the IP prefix.

15. The method of claim 14, wherein each forwarding entry associates a respective prefix with the corresponding FEC entry.

16. The method of claim 14, wherein each forwarding entry further comprises:

an identifier for the corresponding FEC entry.

17. The method of claim 13, wherein the FEC includes a single FEC entry per virtual network.

18. The method of claim 13, wherein each FEC entry is further associated with a media access control (MAC) address and a physical port.

19. The method of claim 13, wherein at least one FEC entry is associated with multiple forwarding entries.

20. A non-transitory machine-readable medium having executable instructions to cause one or more processing units to perform a method to process control plane data in a network element, the method comprising:

programing a forwarding engine of a data plane with forwarding information, wherein the forwarding information comprises:

a forwarding information base comprising a plurality of forwarding entries;

and a forwarding equivalence class (FEC) table comprising a plurality of FEC entries, wherein:

data link layer forwarding data is encoded into the FEC entries;

each forwarding entry in the forwarding information base is associated with a corresponding FEC entry; and each FEC entry comprises an identifier for a virtual network; and forwarding network data based on the forwarding information.

* * * * *